United States Patent
Gummadi et al.

(10) Patent No.: US 12,294,944 B2
(45) Date of Patent: May 6, 2025

(54) USER EQUIPMENT DISCONTINUOUS RECEPTION ASSISTANCE TO IMPROVE NETWORK CONNECTIVITY

(71) Applicant: QUALCOMM Incorporated, San Diego, CA (US)

(72) Inventors: Bapineedu Chowdary Gummadi, Hyderabad (IN); Shivanandu Kumar Reddy Palwai, Denver, CO (US); Hanuma Kumar Anumanula, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 338 days.

(21) Appl. No.: 17/648,085

(22) Filed: Jan. 14, 2022

(65) Prior Publication Data
US 2023/0232326 A1 Jul. 20, 2023

(51) Int. Cl.
*H04W 52/02* (2009.01)
*H04W 68/02* (2009.01)
*H04W 88/06* (2009.01)

(52) U.S. Cl.
CPC ... *H04W 52/0229* (2013.01); *H04W 52/0216* (2013.01); *H04W 68/02* (2013.01); *H04W 88/06* (2013.01)

(58) Field of Classification Search
CPC ......... H04W 52/0229; H04W 52/0216; H04W 68/02; H04W 88/06; H04W 76/28; H04W 8/183; H04W 68/005; Y02D 30/70
USPC ............... 370/311; 455/426.1, 458, 515, 574
See application file for complete search history.

(56) References Cited

U.S. PATENT DOCUMENTS

| | | | |
|---|---|---|---|
| 2015/0373774 A1* | 12/2015 | Belghoul | H04W 76/28 370/252 |
| 2017/0290086 A1* | 10/2017 | Patel | H04W 24/08 |
| 2017/0318536 A1* | 11/2017 | Manepalli | H04W 24/02 |
| 2017/0374598 A1 | 12/2017 | Singh et al. | |
| 2018/0220329 A1* | 8/2018 | Arumugam | H04L 65/1073 |
| 2021/0067209 A1* | 3/2021 | Gopal | H04W 72/0446 |
| 2022/0191787 A1* | 6/2022 | Shahid | H04B 17/318 |

FOREIGN PATENT DOCUMENTS

| | | |
|---|---|---|
| WO | 2017165126 A1 | 9/2017 |
| WO | 2021113581 A1 | 6/2021 |

OTHER PUBLICATIONS

International Search Report and Written Opinion—PCT/US2022/080815—SA/EPO—Mar. 29, 2023.
3GPP TS 38.331: "3rd Generation Partnership Project; Technical Specification Group Radio Access Network; NR; Radio Resource Control (RRC) Protocol Specification (Release 16)", 3GPP TS 38.331, V16.7.0, Dec. 2021, 959 pages.

* cited by examiner

Primary Examiner — Michael Y Mapa
(74) Attorney, Agent, or Firm — Patterson+ Sheridan, L.L.P.

(57) ABSTRACT

Certain aspects of the present disclosure provide techniques for a user equipment (UE) to transmit assistance information to request changes to discontinuous reception (DRX) parameters to improve performance of the UE and its connection to a wireless network. A method that may be performed by a user equipment (UE) includes detecting one or more conditions; and transmitting, in response to the detection, a request to change a connected mode discontinuous reception (CDRX) configuration to a first network.

30 Claims, 13 Drawing Sheets

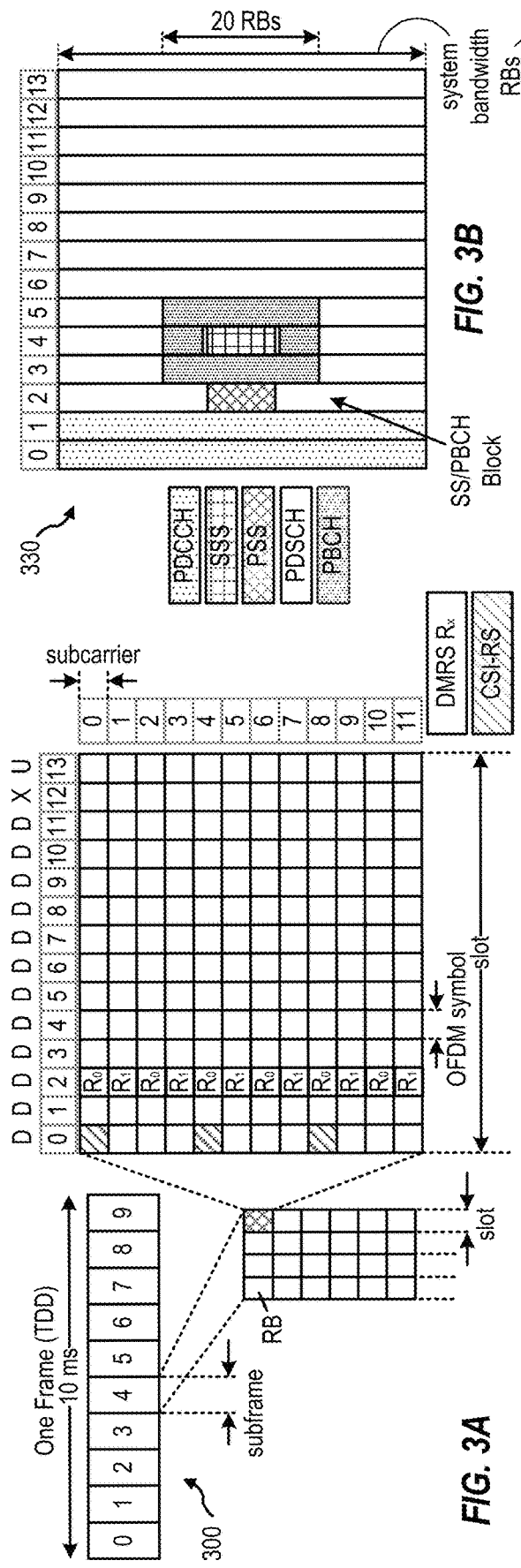
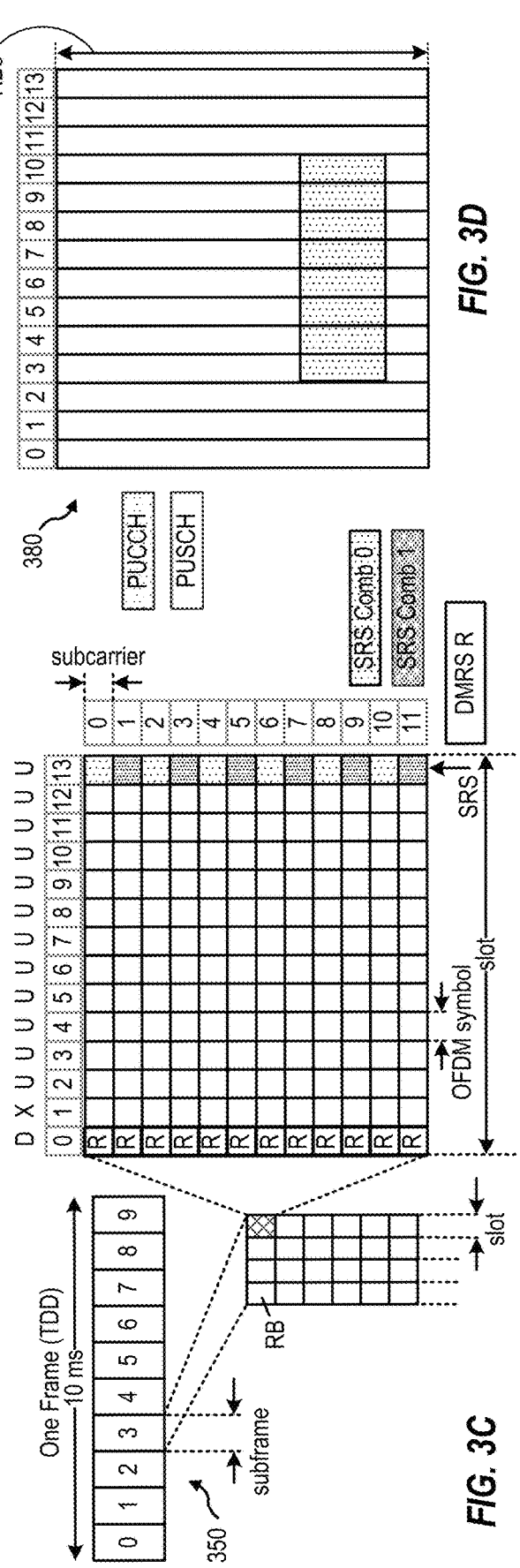

```
DRX-Preference-r16 ::=       SEQUENCE {
    preferredDRX-InactivityTimer-r16        ENUMERATED {
        ms0, ms1, ms2, ms3, ms4, ms5, ms6, ms8, ms10, ms20, ms30, ms40, ms50, ms60, ms80,
        ms100, ms200, ms300, ms500, ms750, ms1280, ms1920, ms2560, spare8, spare7,
        spare6, spare5, spare4, spare3, spare2, spare1 } OPTIONAL,
    preferredDRX-LongCycle-r16              ENUMERATED {
        ms10, ms20, ms32, ms40, ms60, ms70, ms80, ms128, ms160, ms256, ms320, ms512,
        ms640, ms1024, ms1280, ms2048, ms2560, ms5120, ms10240, spare12, spare11, spare10,
        spare9, spare8, spare7, spare6, spare5, spare4, spare3, spare2, spare1 } OPTIONAL,
    preferredDRX-ShortCycle-r16             ENUMERATED {
        ms2, ms3, ms4, ms5, ms6, ms7, ms8, ms9, ms10, ms14, ms16, ms20, ms30, ms32,
        ms35, ms40, ms64, ms80, ms128, ms160, ms256, ms320, ms512, ms640, ms39,
        spare8, spare7, spare6, spare5, spare4, spare3, spare2, spare1 } OPTIONAL,
    preferredDRX-ShortCycleTimer-r16        INTEGER (1..16) OPTIONAL
    ...
}
```

*FIG. 6*

USER EQUIPMENT DISCONTINUOUS RECEPTION ASSISTANCE TO IMPROVE NETWORK CONNECTIVITY

INTRODUCTION

Aspects of the present disclosure relate to wireless communications, and more particularly, to techniques for a user equipment (UE) to transmit assistance information to request changes to discontinuous reception (DRX) parameters to improve performance of the UE and its connection to a wireless network.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

One aspect provides a method of wireless communications by a user equipment (UE). The method generally includes: detecting one or more conditions; and transmitting, in response to the detection, a request to change a connected mode discontinuous reception (CDRX) configuration to a first network.

Another aspect provides a user equipment (UE) configured for wireless communication. The UE generally includes a memory comprising computer-executable instructions; and one or more processors configured to execute the computer-executable instructions and cause the UE to: detect one or more conditions; and transmit, in response to detecting the one or more conditions, a request to change a connected mode discontinuous reception (CDRX) configuration to a first network.

Still another aspect provides a non-transitory computer-readable medium comprising computer-executable instructions that, when executed by one or more processors of a user equipment (UE), cause the UE to perform a method of wireless communication. The method generally includes: detecting one or more conditions; and transmitting, in response to detecting the one or more conditions, a request to change a connected mode discontinuous reception (CDRX) configuration to a first network.

Yet another aspect provides a user equipment (UE) configured for wireless communication. The UE generally includes: means for detecting one or more conditions; and means for transmitting, in response to detecting the one or more conditions, a request to change a connected mode discontinuous reception (CDRX) configuration to a first network.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIGS. 3A, 3B, 3C, and 3D depict various example aspects of data structures for a wireless communication network.

FIG. 6 depicts an example information element (IE) for indicating a DRX preference, in accordance with certain aspects of the present disclosure.

DETAILED DESCRIPTION

Figure 1:
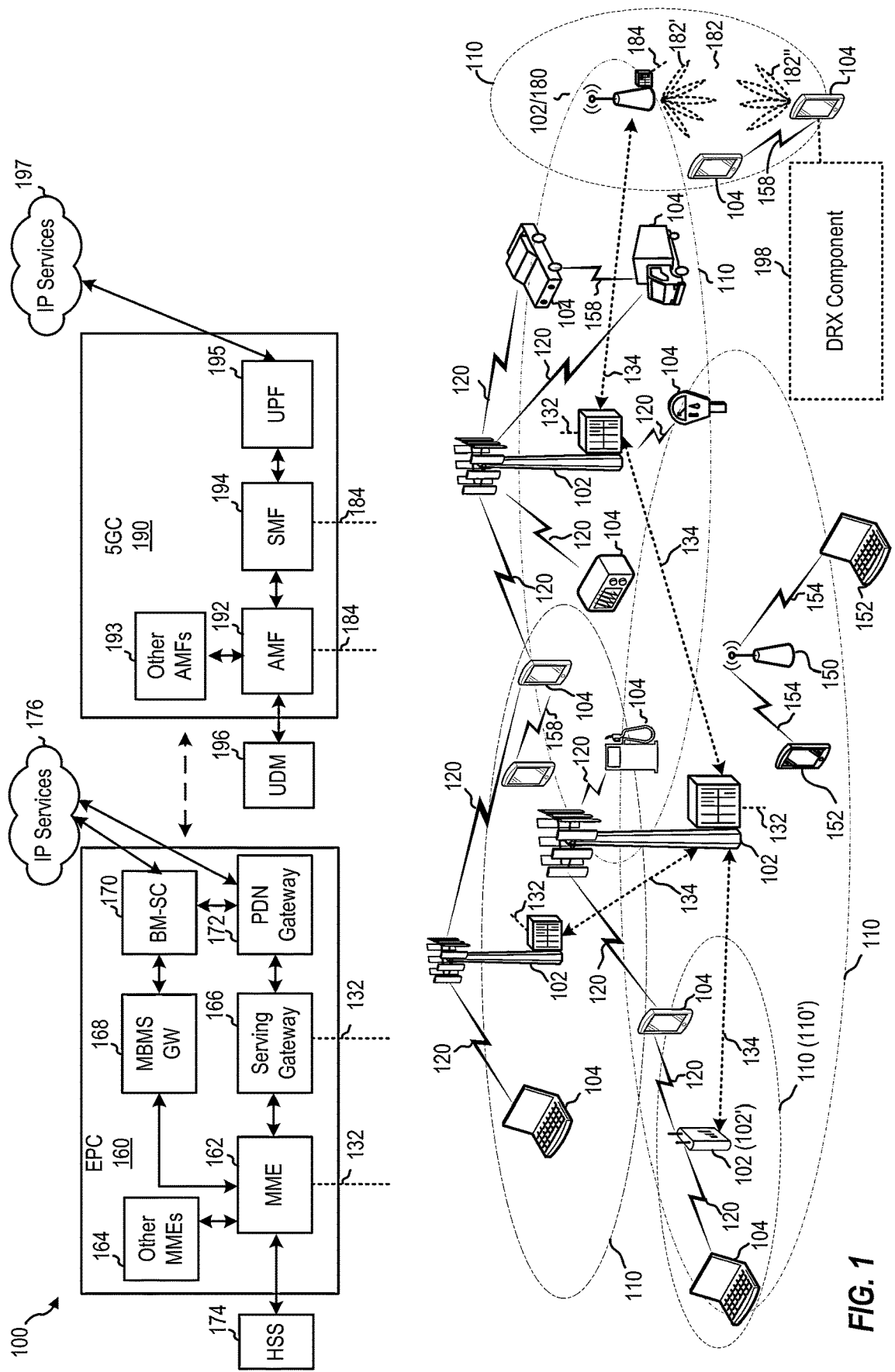
FIG. 1 is a block diagram conceptually illustrating an example wireless communication network.

Aspects of the present disclosure provide apparatuses, methods, processing systems, and computer-readable mediums for a user equipment (UE) to transmit assistance information to request changes to discontinuous reception (DRX) parameters to improve performance of a wireless network connection.

In some wireless communications networks, a network (e.g., a network entity, such as a base station (BS)) may configure a user equipment (UE) to perform connected mode discontinuous reception (CDRX), wherein a receiver(s) of the UE is activated (e.g., powered up or tuned to the network's frequency band) during CDRX on-durations at regular intervals and deactivated (e.g., powered down or tuned to another frequency band) during CDRX off-durations between those intervals. If the network has data to transmit to the UE, then the network delays that transmission until an on-duration when the UE's receiver will be active. Upon beginning to receive a transmission from the network, the UE keeps its receiver active until the network has stopped transmitting to the UE for a period. By using CDRX, a UE may save power as compared to having a receiver of the UE continually active. However, some UEs that have multiple subscriber identity modules (SIMs), are experiencing relatively high mobility (e.g., mobility that is high enough to cause an increase in synchronization errors, such as walking speed with mmWave communications, automobile speeds for lower frequencies, or lower speeds for lower frequency communications in dense, urban environments) or are running applications communicating (e.g., transmitting or receiving) mission-critical data (e.g., data of ultra-reliable low-latency communications (URLLC), data for applications with low-latency quality of service (QoS) characteristics, or data for applications with high reliability QoS characteristics) may have the reliability or performance of the connection to the network negatively impacted by being configured with some CDRX parameters.

In aspects of the present disclosure, a UE may detect a condition which may cause some CDRX parameters to negatively impact reliability or performance of a connection to a wireless network, and in response the UE may transmit a request to change the CDRX parameters. For example, a UE that has multiple SIMs (e.g., a multi SIM UE) supporting multiple network subscriptions may be configured such that CDRX on-durations on a first subscription consistently conflict with (e.g., overlap in time) paging opportunities (POs) of a second subscription. In the example, the UE can transmit a request to change an offset or length of the CDRX on-durations so that the on-durations do not consistently conflict with the POs of the other subscription, and the UE is less likely to miss pages from the network of the other subscription. In another example, a multiSIM UE may be configured such that CDRX on-durations of a first subscription consistently conflict with CDRX on-durations of a second subscription, and the UE may request to change an offset or length of one or both of the CDRX configurations to that the on-durations of the two subscriptions conflict less often. In still another example, a UE may be experiencing high mobility, which is causing the UE to have frequent changes to a timing advance (TA) parameter of the UE. In this example, the UE can request to shorten intervals between on-durations so that the UE can receive the more frequent TA changes from the network. In yet another example, a UE may be running an application that communicates mission-critical data, and the UE may request to shorten intervals between on-durations so that the UE can transmit or receive the mission-critical data more often.

By requesting a change to CDRX parameters, a UE can notify the network to change the CDRX parameters, and, if the network makes the requested change, then reliability or performance of the connection to the wireless network can be improved. This may improve overall reliability of the wireless communications system.

Introduction to Wireless Communication Networks

FIG. 1 depicts an example of a wireless communication network 100, in which aspects described herein may be implemented.

Generally, wireless communication network 100 includes base stations (BSs) 102, user equipments (UEs) 104, and one or more core networks, such as an Evolved Packet Core (EPC) 160 and 5G Core (5GC) network 190, which interoperate to provide wireless communications services.

BSs 102 may provide an access point to the EPC 160 and/or 5GC 190 for a UE 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

A base station, such as BS 102, may include components that are located at a single physical location or components located at various physical locations. In examples in which the base station includes components that are located at various physical locations, the various components may each perform various functions such that, collectively, the various components achieve functionality that is similar to a base station that is located at a single physical location. As such, a base station may equivalently refer to a standalone base station or a base station including components that are located at various physical locations or virtualized locations. In some implementations, a base station including components that are located at various physical locations may be referred to as or may be associated with a disaggregated radio access network (RAN) architecture, such as an Open RAN (O-RAN) or Virtualized RAN (VRAN) architecture. In some implementations, such components of a base station may include or refer to one or more of a central unit (CU), a distributed unit (DU), or a radio unit (RU).

BSs 102 wirelessly communicate with UEs 104 via communications links 120. Each of BSs 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communication links 120 may use multiple-input and multiple-output (MIMO)

antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may also receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

Wireless communication network 100 further includes DRX Component 198, which may be used configured to detect one or more conditions; and transmit, in response to the detection, a request to change a connected mode discontinuous reception (CDRX) configuration to a first network.

Figure 2:
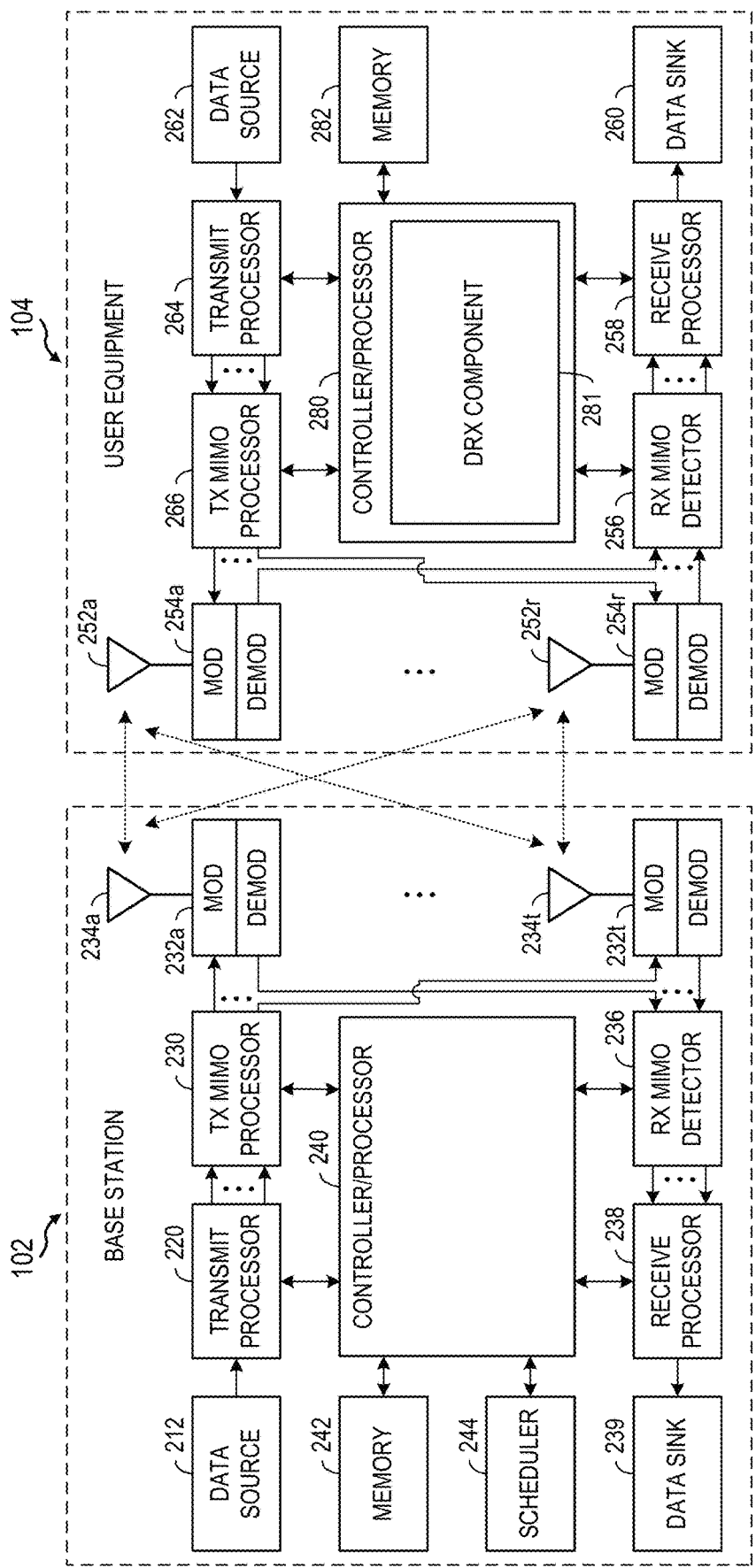
FIG. 2 is a block diagram conceptually illustrating aspects of an example of a base station and user equipment.

FIG. 2 depicts aspects of an example BS 102 and a UE 104. Generally, BS 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., data source 212) and wireless reception of data (e.g., data sink 239). For example, BS 102 may send and receive data between itself and UE 104.

BS 102 includes controller/processor 240, which may be configured to implement various functions related to wireless communications.

Generally, UE 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., data source 262) and wireless reception of data (e.g., data sink 260).

UE 104 includes controller/processor 280, which may be configured to implement various functions related to wireless communications. In the depicted example, controller/processor 280 includes DRX Component 281, which may be representative of DRX Component 198 of FIG. 1. Notably, while depicted as an aspect of controller/processor 280, DRX Component 281 may be implemented additionally or alternatively in various other aspects of UE 104 in other implementations.

FIGS. 3A, 3B, 3C, and 3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A, 3B, 3C, and 3D are provided later in this disclosure.

Introduction to Connected Mode Discontinuous Reception

Figure 4:
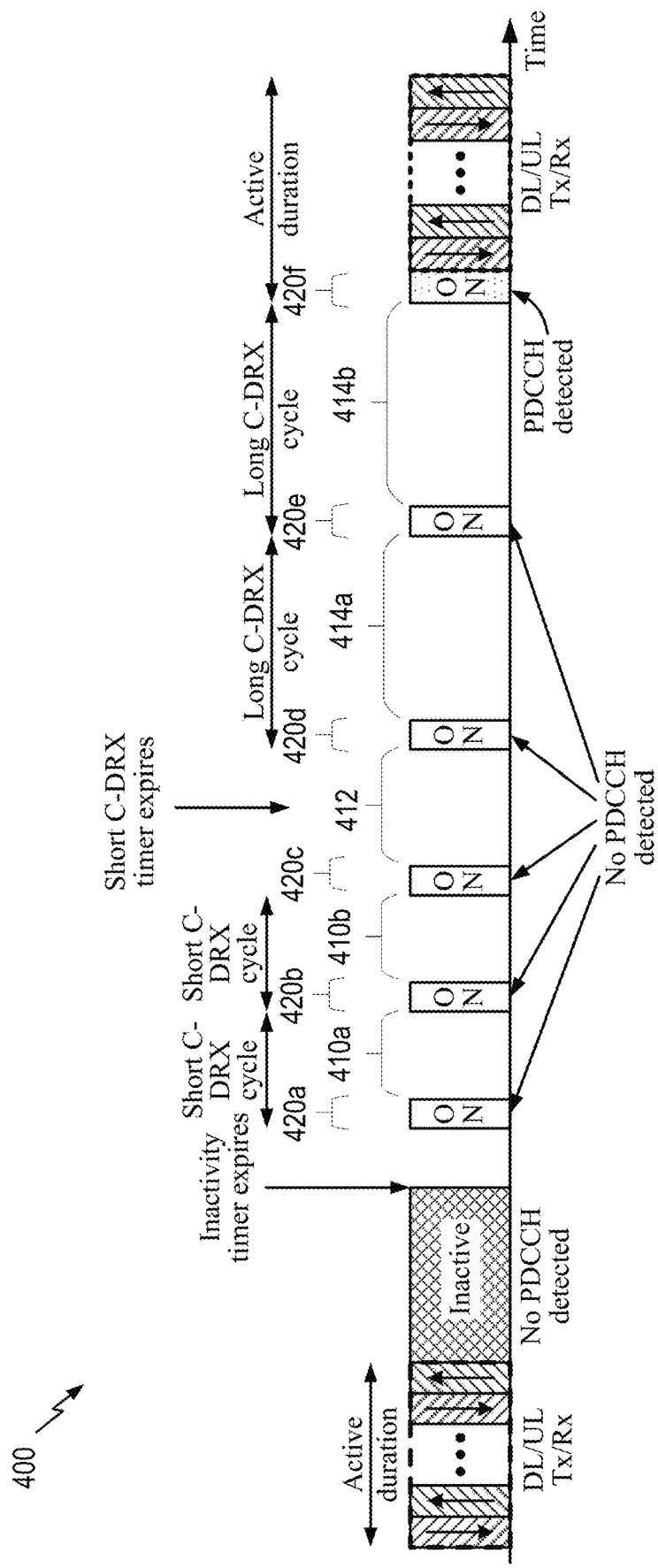
FIG. 4 illustrates connected mode discontinuous reception (CDRX) operations, in accordance with certain aspects of the present disclosure.

As illustrated in an example timing diagram 400 of FIG. 4, during periods of traffic inactivity, a user equipment (UE) may switch to connected mode discontinuous reception (CDRX) operations to reduce power consumption. In the CDRX operations, when there is no data transmission in either an uplink (UL) or a downlink (DL) direction for a UE in a radio resource control (RRC) connected mode, the UE goes into a discontinuous reception (DRX) mode. In the CDRX operations, the UE monitors a physical downlink control channel (PDCCH) discontinuously. In other words, the UE alternates between sleep (DRX OFF) cycles 410a-b, 412, and 414a-b (also referred to herein as off-durations) and wake (DRX ON) cycles 420a-f (also referred to herein as on-durations). The CDRX operations result in power savings because, without the DRX cycles, the UE would monitor for PDCCH transmissions in every subframe to check if there is DL data available.

The UE is configured for the CDRX operations according to various configuration parameters, such as an inactivity timer, short DRX timer, short DRX cycle, long DRX cycle, and DRX offset.

As further illustrated in FIG. 4, based on configured cycles, the UE wakes up occasionally for on-durations 420a-f and monitors for the PDCCH transmissions. Except for the on-durations, the UE remains in a low power (sleep) state referred to as an off-duration, for the rest of CDRX cycle. During an off-duration, the UE is not expected to transmit or receive any signal.

The UE wakes up at a termination of CDRX operations. For example, if the UE detects a PDCCH scheduling data during an on-duration, then the receiver of the UE remains active to receive data for at least an additional inactivity time duration, and a transmitter of the UE remains active to transmit data (e.g., acknowledgments) for at least the same inactivity time duration. Otherwise, the UE goes back to sleep at the end of each on-duration.

Example UE Assistance Information

Figure 5:
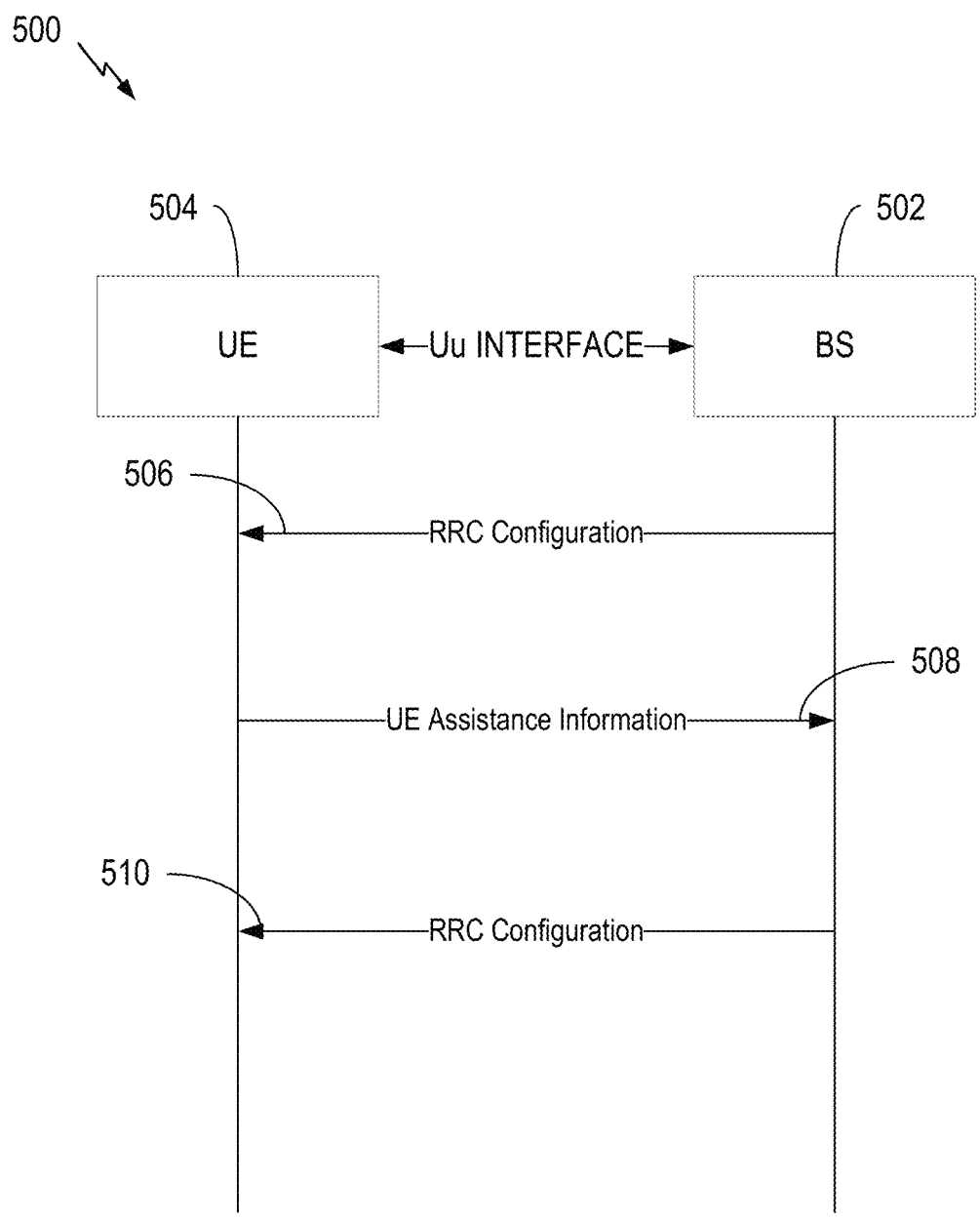
FIG. 5 is a call flow diagram illustrating an example of a UE providing assistance information to a BS, in accordance with certain aspects of the present disclosure.

In certain wireless communication systems (e.g., 5$^{th}$ generation (5G) new radio (NR)), a user equipment (UE) is configured to provide UE assistance information (UAI) to a base station (BS), as shown in FIG. 5. As shown in the call flow 500 shown in FIG. 5, a BS 502 and UE 504 may be communicating via a Uu interface. The BS 502 may send a radio resource control (RRC) configuration message at 506 that configures CDRX parameters on the UE 504. At 508, the UE may send UAI to the BS to request a change to the CDRX parameters that the UE will use. The UE uses the UAI to indicate various parameters such as a UE delay budget report (carrying desired increment/decrement in Uu air interface delay), a connected mode discontinuous reception (CDRX) cycle length, or overheating assistance information to the BS. If the BS decides to update the CDRX configuration of the UE, then at 510 the BS transmits an updated CDRX configuration via another RRC Configuration message.

In some cases, a UE that is capable of providing delay budget reporting in a radio resource control (RRC) state, such as an RRC_CONNECTED state, initiates a procedure of providing the UAI. For example, the UE initiates the procedure upon being configured to provide the delay budget report and upon change of a delay budget preference. As another example, the UE that is capable of providing the overheating assistance information in the RRC_CONNECTED state initiates the procedure if the UE is configured to do so, upon detecting internal overheating, or upon detecting that the UE is no longer experiencing an overheating condition.

In NR Rel-16, a provision is provided for the UE to communicate its preferred set of CDRX parameters (i.e., a DRX-Preference) to the network entity. The network entity, on receiving the preferred set of CDRX parameters from the UE, may adjust values of CDRX parameters per the UE request, possibly resulting in the UE saving power. An information element (IE) 600 that can be used to send the preferred set of CDRX parameters is illustrated in FIG. 6.

Example Multiple Subscriber Identity Module (MultiSIM) Device

Figure 7A:
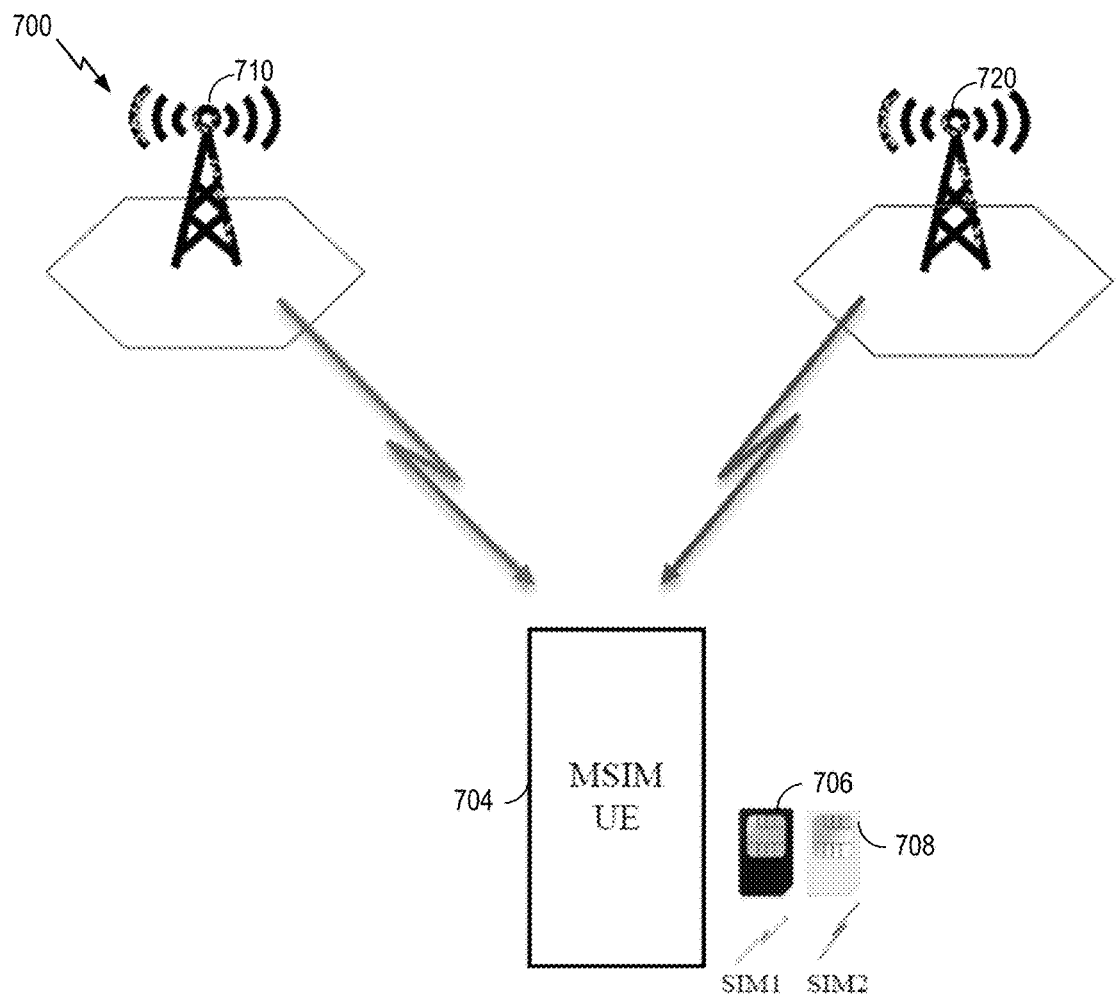
FIG. 7A illustrates an example multi SIM deployment for a UE, in accordance with certain aspects of the present disclosure.

FIG. 7A illustrates an example multi SIM (MSIM) deployment 700, in which a UE 704 supports multiple SIMS, SIM1 706 and SIM2 708, which may support the same or different radio access technologies (RATs). The UE 704 may be an example of UE 104, shown in FIGS. 1 and 2. SIM1 may have a subscription to a first network. The UE may communicate with that first network via a BS 710. SIM2 may have a subscription to a second network. The UE may communicate with that second network via a BS 720. Each of BS 710 and 720 may be examples of BS 102, shown in FIGS. 1 and 2. At any given time, the SIMs 706 and 708 may concurrently be in an idle state and may support different modes of operation. For example, if the UE has a single receiver, then the UE may support a Single Receive Dual SIM Dual Standby (SR-DSDS) mode, where only one RAT is received at a time. In another example, if the UE has two receivers, then the UE may support a Dual Receive Dual SIM Dual Standby (DR-DSDS) mode, wherein the UE may simultaneously receive multiple RATs.

Figure 7B:
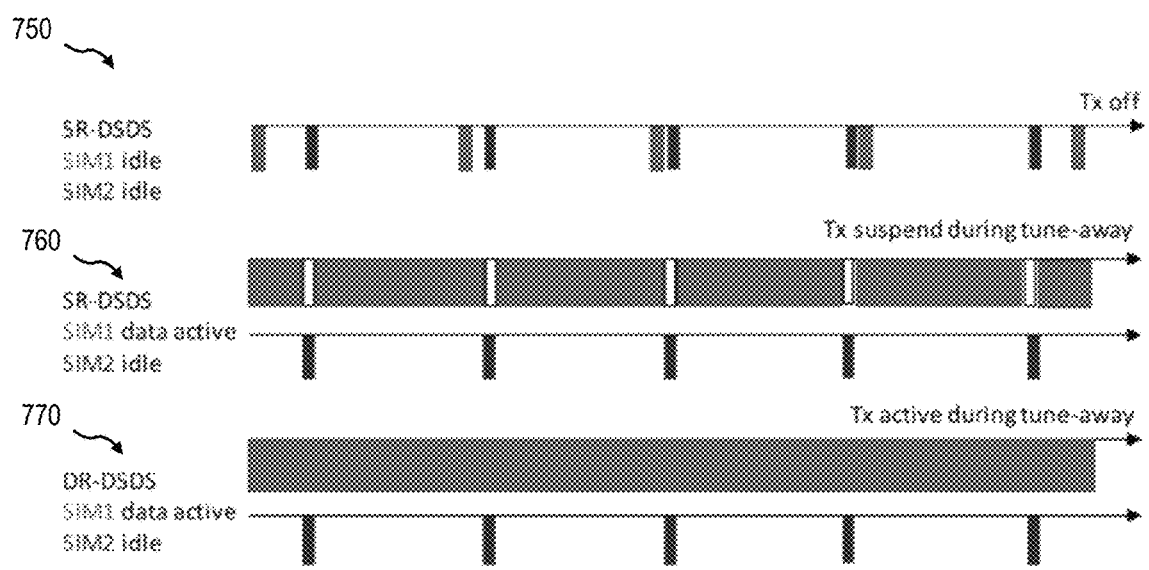
FIG. 7B illustrates timelines of multi SIM access, in accordance with certain aspects of the present disclosure.

FIG. 7B shows various example scenarios 750, 760, and 770 for SR-DSDS and DR-DSDS modes when SIM1 and SIM2 are both connected at the same time for the SR-DSDS and DR-DSDS modes. As illustrated in the SR-DSDS scenarios 750 and 760, the transmitter may be alternately off to service the different SIMs or the UE may suspend operations on one SIM to tune-away and monitor for transmission on the other SIM. In the DR-DSDS scenario 770, the transmitter may be active during a tune-away. For data transmissions, there is the potential to tune-away from one SIM to monitor the network of the other SIM for reception. For voice applications, the idle SIM may be completely suspended (while serving voice on the active SIM).

Aspects Related to Transmitting UAI to Request Changes to DRX to Improve Performance of a Wireless Network Connection In some cases, a network (e.g., a network entity, such as a BS) may decide on and configure CDRX parameters for a UE to enable the UE to save power in connected mode. In some cases, a UE may transmit DRX assistance information as part of further UE power saving, wherein the UE can send its preferred DRX parameters to the network (NW), though it is up to the NW to re-configure the DRX parameters according to the UE's request.

In aspects of the present disclosure, a UE may transmit UE assistance information (UAI) to improve the performance of the UE's connection to the network. If the UE has multiple subscriber identity modules (in which case the UE may be referred to herein as a multiSIM UE) and receives a DRX configuration from a first network (e.g., to which the UE has a subscription supported by a first SIM), the UE may transmit UAI to request to change the DRX configuration to improve the performance of the UE's connection to the first network or to a second network (e.g., to which the UE has a subscription supported by a second SIM).

According to aspects of the present disclosure, a UE may transmit UAI to change DRX settings of the UE based on the UE having multiple SIMS. In such a case, the UE may have a subscription to a first network (referred to herein as "SUB1") supported by the first SIM and another subscription to a second network (referred to herein as "SUB2") supported by the second SIM. When the UE is configured to perform DRX on SUB1, it is possible that the on-durations of SUB1 overlap with the paging occasions (POs) of SUB2. In such a case, the UE can then send UAI to the first network to request to change the DRX configuration to either prevent the POs of SUB2 from overlapping with the on-durations of SUB1 or to reduce (e.g., the number or the length of) the overlaps.

Figure 8:
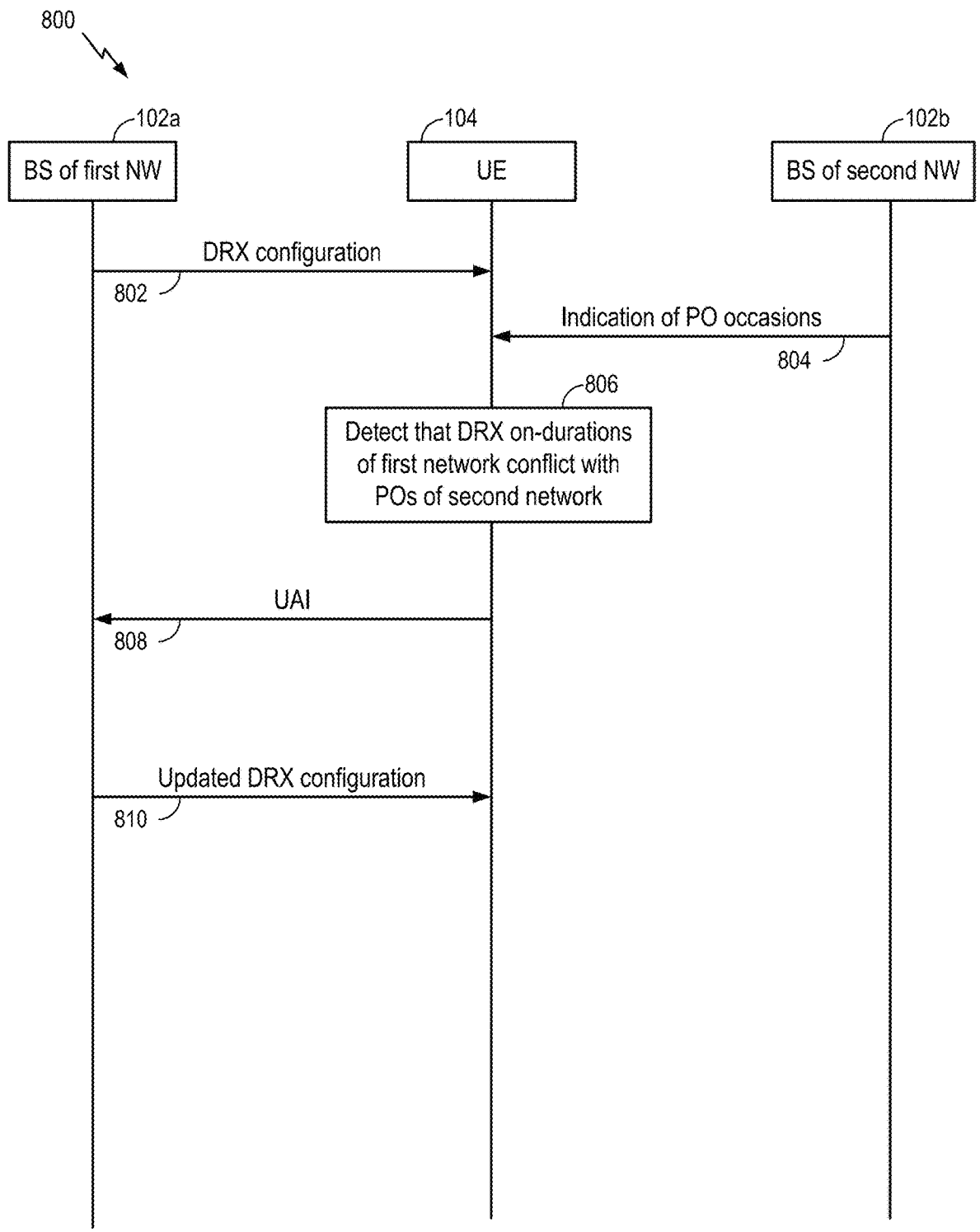
FIG. 8 depicts an example call flow diagram between a UE, a first BS, and a second BS, in accordance with an aspect of the present disclosure.

FIG. 8 depicts an example call flow diagram 800 showing an exchange of messages between a UE 104 (see also FIGS. 1-2), a first BS 102a of a first network, and a second BS 102b of a second network, in accordance with an aspect of the present disclosure. In the example call flow 800, the UE 104 is a multiSIM UE that has a subscription to the first network supported by a first SIM and a subscription to the second network supported by a second SIM. At 802, BS 102a transmits (e.g., via a radio resource control (RRC) signal) a DRX configuration having a long DRX cycle that is a multiple or submultiple of 128 ms and without short DRX configured. At 804, BS 102b transmits an indication that the second network has assigned the UE a paging cycle that is 128 ms long, with POs occurring during the DRX on-durations of the long DRX cycle of the first network.

Still referring to FIG. 8, the UE detects that the DRX on-durations of the first network conflict with the POs of the second network at 806. In response to this detection, at 808 the UE transmits UAI to BS 102a to, for example, request to change the long DRX cycle to 160 ms or to add a short DRX configuration to the DRX configuration of the UE. At 810, the BS 102a transmits an updated DRX configuration in response to the UE's request. While the example call flow diagram shows the BS 102a transmitting the DRX configuration at 802 before the BS 102b transmits the indication of the POs at 804, the present disclosure is not so limited, and the BS 102b may transmit the indication of the POs before or simultaneously with the transmission of the DRX configuration at 802. Changing the long DRX cycle may improve the communication performance of the UE by enabling the UE to avoid page misses on the second network.

In aspects of the present disclosure, if a multiSIM UE has established connections on two subscriptions, the two subscriptions may transmit similar DRX configurations to the UE with overlapping on-durations. In such a case, device performance may be negatively impacted since a typical UE may not be able to simultaneously decode physical downlink control channels (PDCCHs) from each of the two subscriptions. The multiSIM UE may transmit UAI to one or both of the networks (of the subscriptions) to change one or both of the DRX configurations so as to reduce or eliminate the overlaps in the on-durations of the DRX configurations.

Figure 9:
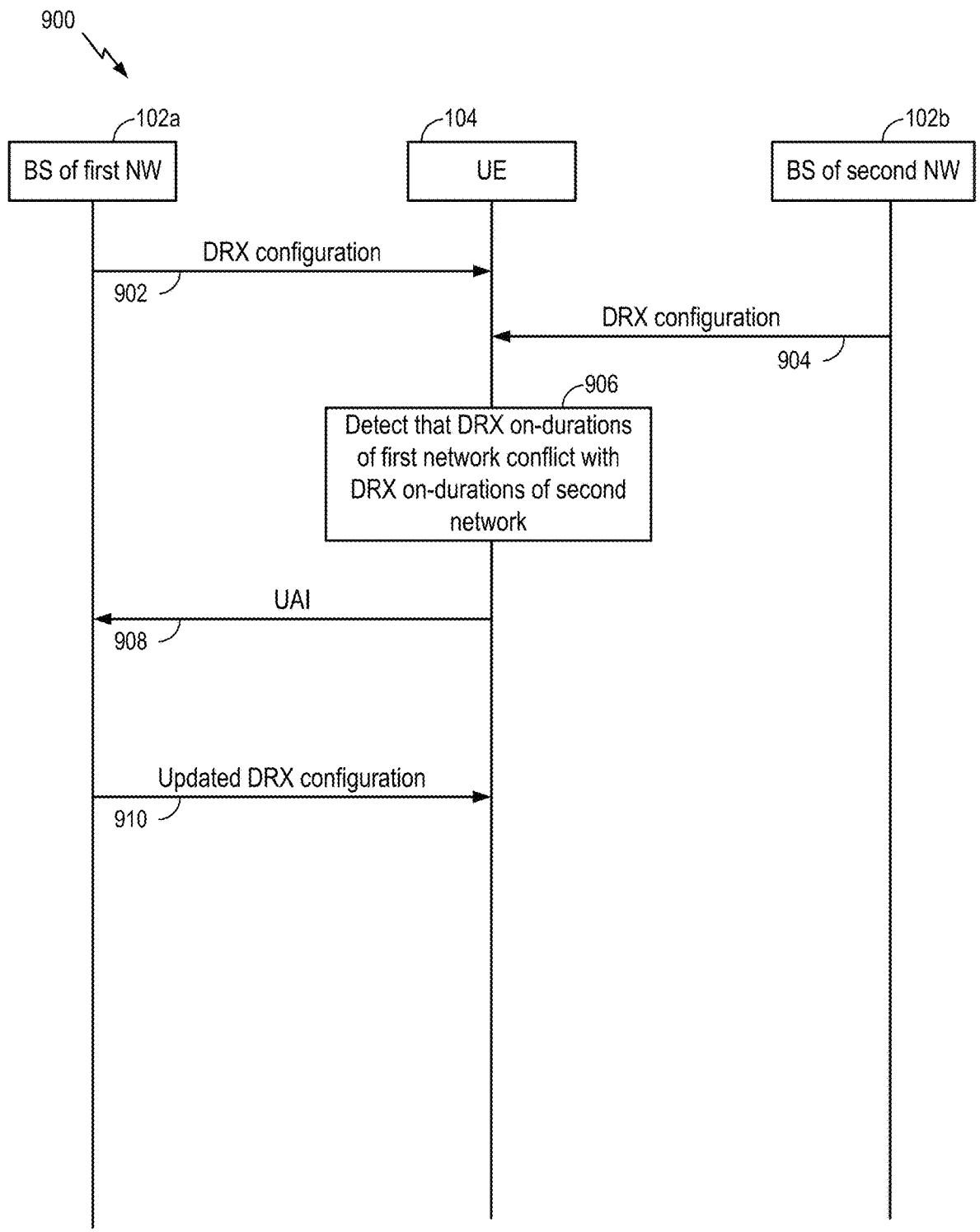
FIG. 9 depicts an example call flow diagram between a UE, a first BS, and a second BS, in accordance with an aspect of the present disclosure.

FIG. 9 depicts an example call flow diagram 900 showing an exchange of messages between a UE 104 (see also FIGS. 1-2), a first BS 102a of a first network, and a second BS 102b of a second network, in accordance with an aspect of the present disclosure. In the example call flow 900, the UE 104 is a multiSIM UE that has a subscription to the first network supported by a first SIM and a subscription to the second network supported by a second SIM. At 902, BS 102a transmits (e.g., via a radio resource control (RRC) signal) a DRX configuration having a DRX cycle that is a multiple or submultiple of 128 ms and without short DRX configured. At 904, BS 102b transmits a DRX configuration having a DRX cycle that is also a multiple or submultiple of 128 ms and without short DRX configured, with a DRX start offset that results in DRX on-durations of the second network occurring during the DRX on-durations of the DRX cycle of the first network.

Still referring to FIG. 9, the UE detects that the DRX on-durations of the first network conflict with the DRX on-durations of the second network at 906. In response to this detection, at 908 the UE transmits UAI to BS 102a to, for example, request to change the DRX cycle to 160 ms or to add a short DRX configuration to the DRX configuration of the UE on the first network. At 910, the BS 102a transmits an updated DRX configuration in response to the UE's request. While the example call flow shows the UE transmitting the UAI to the network from which the UE received a first DRX configuration, the present disclosure is not so limited, and the UE may transmit the UAI to the network from which the UE received a second DRX configuration. Changing the long DRX cycle may improve the communication performance of the UE by enabling the UE to avoid missing PDCCHs on one or both of the two networks. In some previously known techniques, a multiSIM UE with DRX configurations from two networks having conflicting on-durations would trigger a radio link failure (RLF) on one of the two networks; according to aspects of the present disclosure, a multiSIM UE with DRX configurations from two networks having conflicting on-durations may transmit UAI and avoid triggering an RLF on either of the two networks.

According to aspects of the present disclosure, a UE may determine to transmit UAI to a network (e.g., a network entity) based on mobility of the UE.

In aspects of the present disclosure, a UE experiencing high mobility may have its timing advance (TA) changed quickly (e.g., often or by large amounts). If a UE experiencing high mobility fails to receive frequent TA changes from the network (e.g., the UE is performing DRX and frequently not receiving, or the network is not transmitting frequent TA changes to the UE), this may cause synchronization issues between the UE and a network entity, which in turn may degrade the communications performance of the UE, due to the synchronization issues causing a high block error rate (BLER) for transmissions by the UE to the network and other types of errors.

According to aspects of the present disclosure, a UE performing DRX will not be transmitting channel state information reference signals (CSI-RSs) or sounding reference signals (SRSs) during the off-durations of the DRX cycle. Thus, when a UE is experiencing high mobility and has a large DRX cycle length, the network serving that UE will not be estimating the TA frequently and also the UE will not be estimating the frequency tracking loop (FTL) or time tracking loop (TTL) for transmissions to the network frequently, and this might result in a synchronization issue or other performance degradation.

In aspects of the present disclosure, a UE performing DRX and experiencing high mobility may transmit UAI so as to reduce the DRX cycle length and/or to have more short DRX cycles, so that synchronization between the device and a network entity (gNB) may be better-maintained.

According to aspects of the present disclosure, a UE performing DRX and experiencing high mobility may determine a DRX cycle length or a reduction in the DRX cycle length to request from the network (e.g., in UAI) based on the speed of the UE and/or the errors detected by the UE.

Figure 10:
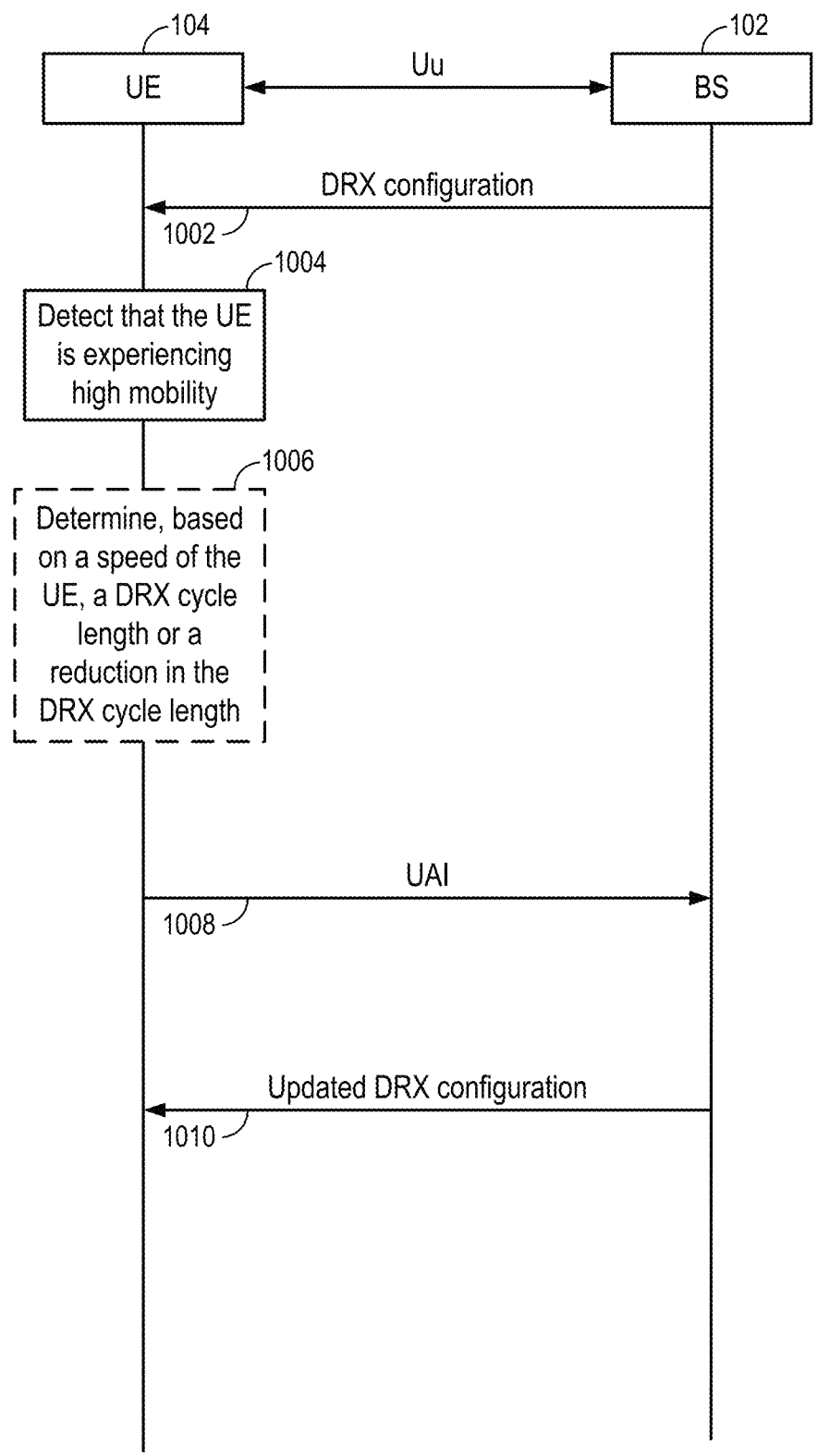
FIG. 10 depicts an example call flow diagram between a UE and a BS, in accordance with an aspect of the present disclosure.

FIG. 10 depicts an example call flow diagram 1000 showing an exchange of messages between a UE 104 (see also FIGS. 1-2) and a BS 102, in accordance with an aspect of the present disclosure. The UE and the BS are communicating via a Uu interface. At 1002, the BS transmits (e.g., via a radio resource control (RRC) signal) a DRX configuration to the UE. At 1004, the UE detects that the UE is experiencing high mobility. As discussed herein, the UE may detect that the UE is experiencing high mobility based on detecting a high BLER or other errors. The UE optionally determines, based on a speed of the UE, a DRX cycle length or a reduction in the DRX cycle length to request from the network at 1006. In response to the detection at 1004 that the UE is experiencing high mobility, at 1008 the UE transmits UAI to the BS to, for example, request to change the DRX cycle length to a shorter DRX cycle length or to add a short DRX configuration to the DRX configuration of the UE. At 1010, the BS transmits an updated DRX configuration in response to the UE's request.

In aspects of the present disclosure, a UE may determine to transmit UAI to a network (e.g., a network entity) based on a type of data the UE has to transmit or receive.

According to aspects of the present disclosure, the network (e.g., a network entity) may configure DRX parameters for a UE based on the network's expectations of data to send to the UE. In many situations, the only data that the network will be sending on its own to the UE is the signaling data (e.g., configuration of the DRX parameters). However, the UE may have information regarding applications which will be running on the UE, and thus the UE may know when to send data of various types and also when to expect to receive data of various types. Thus, the UE can request DRX configuration based on the type of data the UE has to send or expects to receive. The types of data may include mission-critical (e.g., location related measurements or payment related information) or non-critical (e.g., WhatsApp data or data for applications that are running background). If there is any mission-critical data to be sent or that the UE expects to receive, then the UE may request to configure a short DRX cycle and/or multiple short DRX configurations. If there is no mission-critical data to be sent or that the UE expects to receive (e.g., the UE expects to send and receive only non-critical data), then the UE may request to configure a long DRX cycle with a longer cycle length, possibly without a short DRX configuration.

Figure 11:
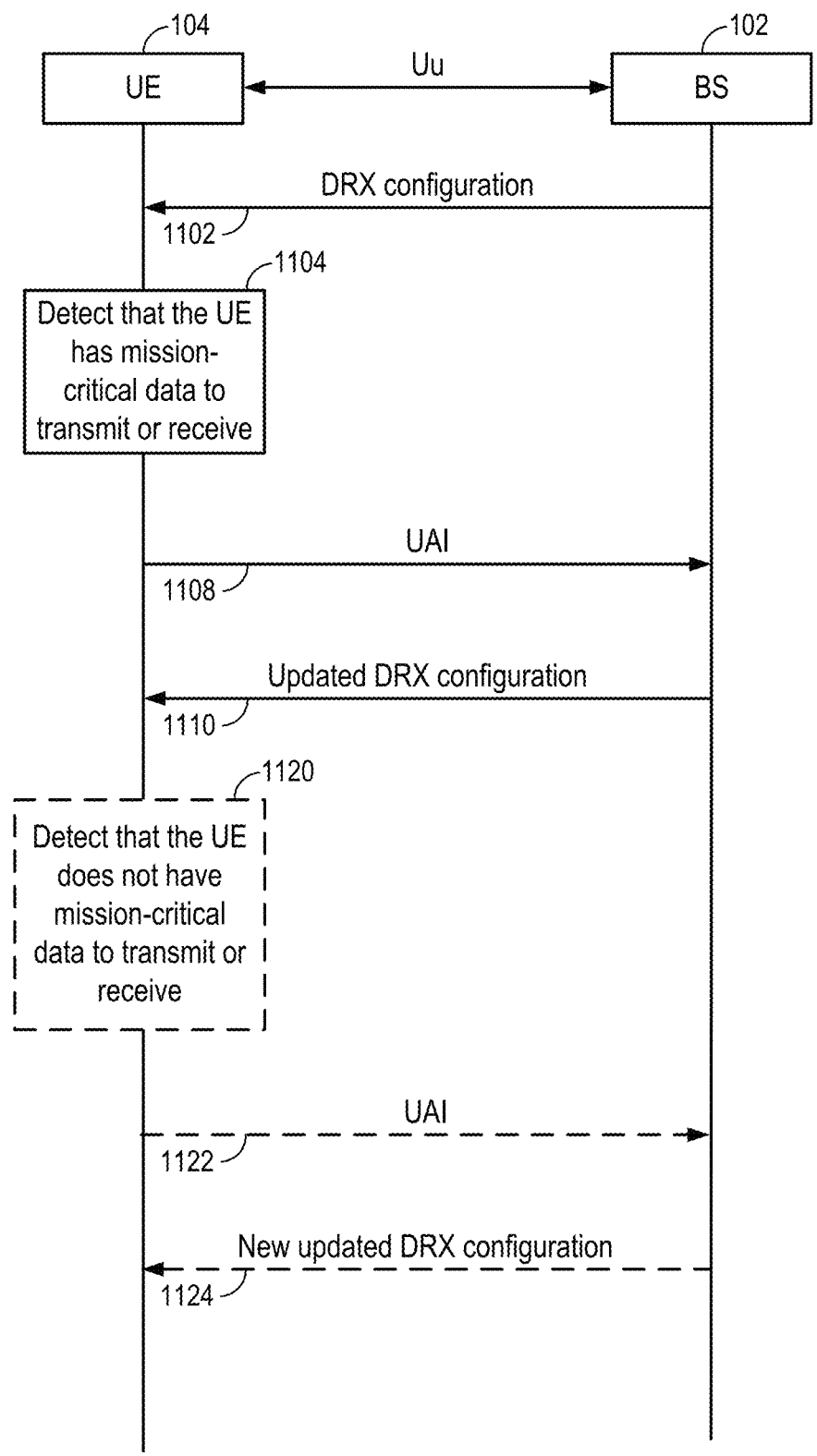
FIG. 11 depicts an example call flow diagram between a UE and a BS, in accordance with an aspect of the present disclosure.

FIG. 11 depicts an example call flow diagram 1100 showing an exchange of messages between a UE 104 (see also FIGS. 1-2) and a BS 102, in accordance with an aspect of the present disclosure. The UE and the BS are communicating via a Uu interface. At 1102, the BS transmits (e.g., via a radio resource control (RRC) signal) a DRX configuration to the UE. At 1104, the UE detects that the UE has mission-critical data to transmit to the BS or receive from the BS. In response to the detection at 1104 that the UE has mission-critical data to transmit to the BS or receive from the BS, at 1108 the UE transmits UAI to the BS to, for example, request to change the DRX cycle length to a shorter DRX cycle length or to add a short DRX configuration to the DRX configuration of the UE. At 1110, the BS transmits an updated DRX configuration in response to the UE's request 1108. Later, at 1120, the UE optionally detects that the UE does not have mission-critical data to transmit or receive. In response to the detection at 1120 that the UE does not have mission-critical data to transmit to the BS or receive from the BS, at 1122 the UE transmits UAI to the BS to, for example, request to change the DRX cycle length to a longer DRX cycle length or to remove a short DRX configuration to the DRX configuration of the UE. At 1124, the BS transmits a new updated DRX configuration in response to the UE's request 1122.

Example Methods

Figure 12:
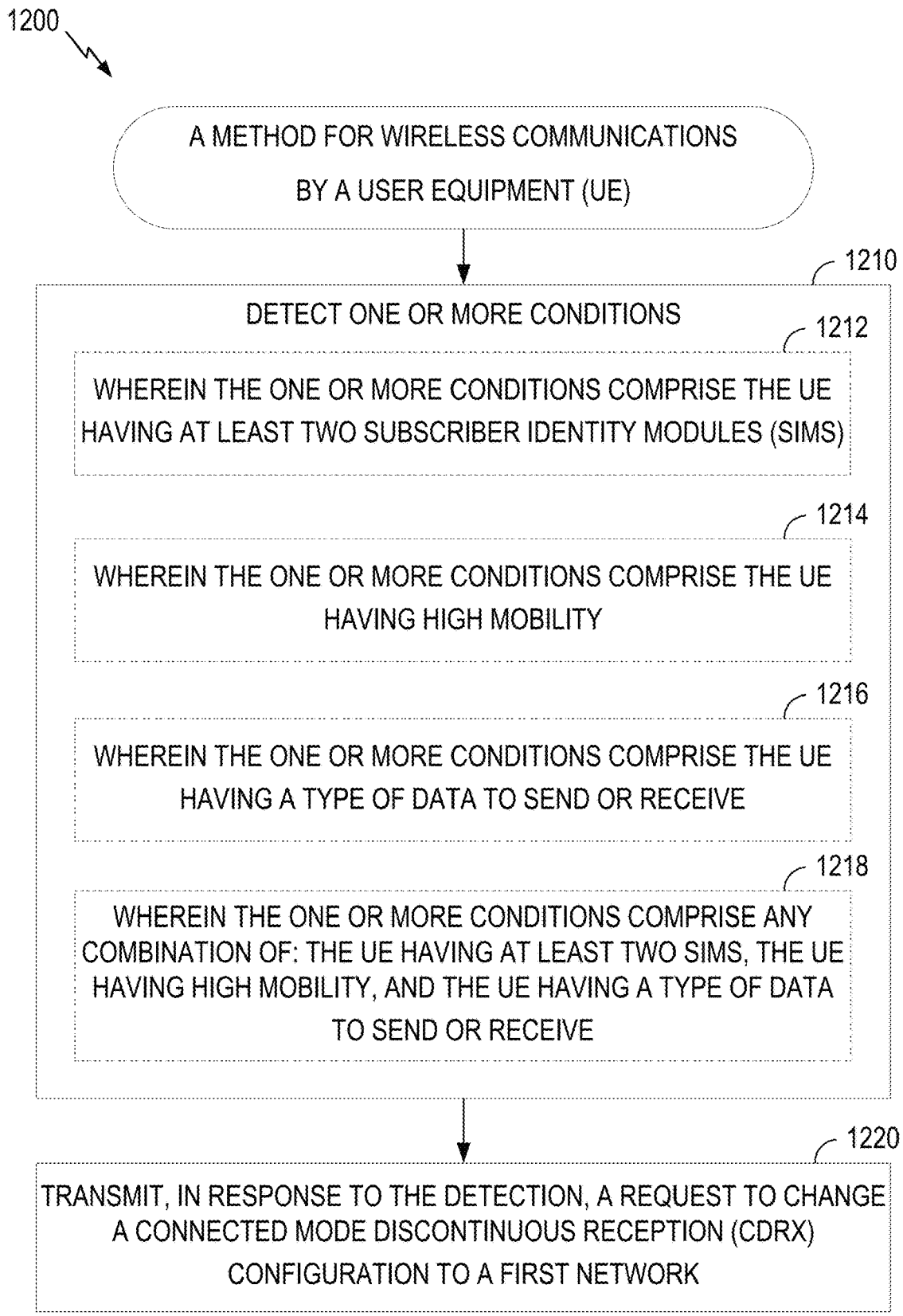
FIG. 12 depicts an example process for wireless communication according to aspects of the present disclosure.

FIG. 12 shows an example of a method 1200 for wireless communication according to aspects of the present disclosure. In some aspects, a user equipment, such as UE 104 of FIGS. 1 and 2, or processing system 1302 of FIG. 13, may perform the method 1200.

At operation 1210, the UE or processing system detects one or more conditions. In some cases, the operations of this step refer to, or may be performed by, detecting circuitry as described with reference to FIG. 13. In some aspects, the one or more conditions comprise the UE having at least two subscriber identity modules (SIMs), as shown in block 1212. In some aspects, the one or more conditions comprise the UE having high mobility, as shown in block 1214. In some aspects, the one or more conditions comprise the UE having a type of data to send or receive, as shown in block 1216. In some aspects, the one or more conditions comprise any combination of: the UE having at least two SIMS, the UE having high mobility, and the UE having a type of data to send or receive, as shown in block 1218.

At operation 1220, the UE or processing system transmits, in response to the detection, a request to change a connected mode discontinuous reception (CDRX) configuration to a first network. In some cases, the operations of this step refer to, or may be performed by, transmitting circuitry as described with reference to FIG. 13.

In some aspects, the one or more conditions comprise: the UE having at least two subscriber identity modules (SIMs), the at least two SIMs including a first SIM supporting a first subscription for the first network, the at least two SIMS including a second SIM supporting a second subscription for a second network, the CDRX configuration being for communications with the first network, and on-durations of a CDRX cycle of the CDRX configuration conflicting with paging occasions (POs) of the second network; and the request comprises a request to change a length of the CDRX cycle to a new length. In some such aspects, the method 1200 further includes determining the new length based on a length of a paging cycle of the second network. In some such aspects, the CDRX cycle is a long DRX cycle; and the request comprises at least one of: a request to add a short DRX cycle to the CDRX configuration, a request to change a start offset of the CDRX cycle (which can, for example, also be changed by adding a short DRX cycle or changing a short DRX cycle timer), a request to change a short DRX cycle length, a request to change a short DRX cycle timer, a request to change a DRX inactivity timer, and a request to change a long DRX cycle length.

In some aspects, the one or more conditions comprise: the UE having at least two subscriber identity modules (SIMs), the at least two SIMs including a first SIM supporting a first subscription for the first network, the at least two SIMS including a second SIM supporting a second subscription for a second network, the CDRX configuration being for communications with the first network, another CDRX configuration being for communications with the second network, and on-durations of a CDRX cycle of the CDRX configuration conflicting with other on-durations of another CDRX cycle of the other CDRX configuration; and the request comprises at least one of: a request to change a length of the CDRX cycle, a request to change a start offset of the CDRX cycle, a request to add a short DRX cycle to the CDRX configuration, a request to change a short DRX cycle length, a request to change a short DRX cycle timer, a request to change a DRX inactivity timer, and a request to change a long DRX cycle length.

In some aspects, the one or more conditions comprise the UE having high mobility; and the request comprises a request to change a previous length of a CDRX cycle of the CDRX configuration to a new length that is shorter than the previous length. In some such aspects, the method 1200 further includes determining the new length based on a speed of the UE. In some such aspects, the method 1200 further includes determining the new length based on one or more errors detected by the UE.

In some aspects, the one or more conditions comprise the UE having a type of data to transmit or receive. In some such aspects, the type of data is mission-critical, and the request comprises a request to change a previous length of a CDRX cycle of the CDRX configuration to a new length that is shorter than the previous length. In some such aspects, the type of data is mission-critical, a CDRX cycle of the CDRX configuration is a long DRX cycle, and the request comprises a request to add a short DRX cycle to the CDRX configuration. In some such aspects, the type of data is non-critical, and the request comprises a request to change a previous length of a CDRX cycle of the CDRX configuration to a new length that is longer than the previous length. In some such aspects, the type of data is non-critical, the CDRX configuration comprises a short DRX cycle, and the request comprises at least one of: a request to change a previous length of the short DRX cycle to a new length that is longer than the previous length, long DRX cycle and a request to change a previous short DRX cycle timer length to a new short DRX cycle timer length that is shorter than the previous short DRX cycle timer length.

Example Wireless Communication Devices

Figure 13:
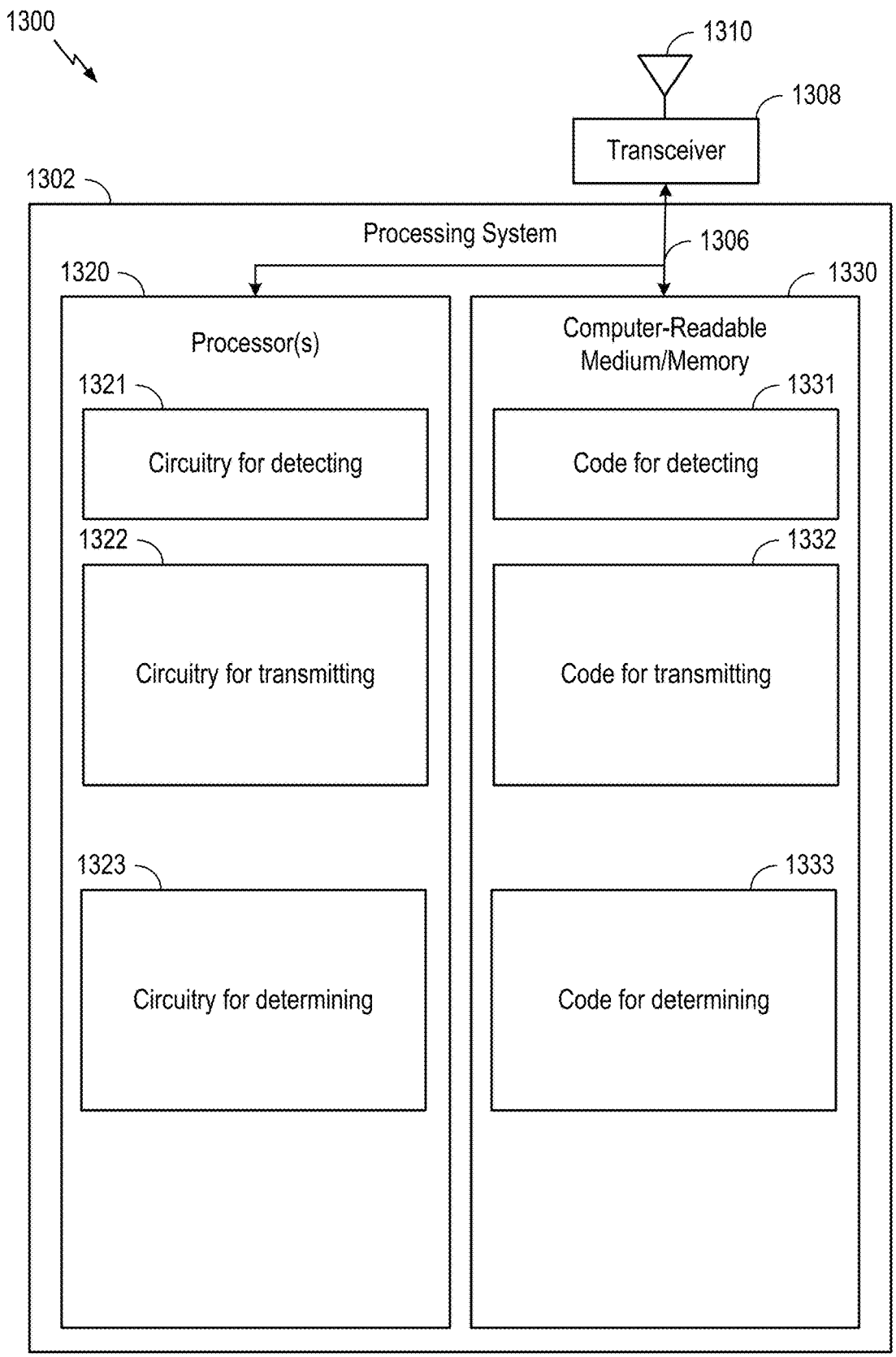
FIG. 13 depicts aspects of an example communications device.

FIG. 13 depicts an example communications device 1300 that includes various components operable, configured, or adapted to perform operations for the techniques disclosed herein, such as the operations depicted and described with respect to FIGS. 8-12. In some examples, communication device 1300 may be a UE 104 as described, for example with respect to FIGS. 1 and 2.

Communications device 1300 includes a processing system 1302 coupled to a transceiver 1308 (e.g., a transmitter and/or a receiver). Transceiver 1308 is configured to transmit (or send) and receive signals for the communications device 1300 via an antenna 1310, such as the various signals as described herein. Processing system 1302 may be configured to perform processing functions for communications device 1300, including processing signals received and/or to be transmitted by communications device 1300.

Processing system 1302 includes one or more processors 1320 coupled to a computer-readable medium/memory 1330 via a bus 1306. In certain aspects, computer-readable medium/memory 1330 is configured to store instructions (e.g., computer-executable code) that when executed by the one or more processors 1320, cause the one or more processors 1320 to perform the operations illustrated in FIGS. 8-12, or other operations for performing the various techniques discussed herein for transmitting assistance information to request changes to discontinuous reception (DRX) parameters to improve performance of a wireless network connection.

In the depicted example, computer-readable medium/memory 1330 stores code 1331 for detecting, code 1332 for transmitting, and code 1333 for determining.

In the depicted example, the one or more processors 1320 include circuitry configured to implement the code stored in the computer-readable medium/memory 1330, including circuitry 1321 for detecting, circuitry 1322 for transmitting, and circuitry 1323 for determining.

Various components of communications device 1300 may provide means for performing the methods described herein, including with respect to FIGS. 8-12.

In some examples, means for transmitting or sending (or means for outputting for transmission) may include the transceivers 254 and/or antenna(s) 252 of the UE 104 illustrated in FIG. 2 and/or transceiver 1308 and antenna 1310 of the communication device 1300 in FIG. 13.

In some examples, means for receiving (or means for obtaining) may include the transceivers 254 and/or antenna(s) 252 of the UE 104 illustrated in FIG. 2 and/or transceiver 1308 and antenna 1310 of the communication device 1300 in FIG. 13.

In some examples, means for detecting or determining may include various processing system components, such as: the one or more processors 1320 in FIG. 13, or aspects of the UE 104 depicted in FIG. 2, including receive processor 258, transmit processor 264, TX MIMO processor 266, and/or controller/processor 280 (including DRX component 281).

Notably, FIG. 13 is an example, and many other examples and configurations of communication device 1300 are possible.

Example Clauses

Implementation examples are described in the following numbered clauses:

Clause 1: A method for wireless communications by a user equipment (UE), the method comprising: detecting one or more conditions; and transmitting, in response to the detection, a request to change a connected mode discontinuous reception (CDRX) configuration to a first network.

Clause 2: The method of clause 1, wherein the one or more conditions comprise: the UE having at least two subscriber identity modules (SIMs); the UE having high mobility; the UE having a type of data to send or receive; or any combination thereof.

Clause 3: The method of clause 1, wherein: the one or more conditions comprise: the UE having at least two subscriber identity modules (SIMs), the at least two SIMS including a first SIM supporting a first subscription for the first network, the at least two SIMs including a second SIM supporting a second subscription for a second network, the CDRX configuration being for communications with the first network, and on-durations of a CDRX cycle of the CDRX configuration conflicting with paging occasions (POs) of the second network; and the request comprises a request to change a length of the CDRX cycle to a new length.

Clause 4: The method of clause 3, further comprising: determining the new length based on a length of a paging cycle of the second network.

Clause 5: The method of any of clauses 3-4, wherein: the CDRX cycle is a long discontinuous reception (DRX) cycle; and the request comprises at least one of: a request to add a short DRX cycle to the CDRX configuration, a request to change a start offset of the CDRX cycle, a request to change a short DRX cycle length, a request to change a short DRX cycle timer, a request to change a DRX inactivity timer, and a request to change a long DRX cycle length.

Clause 6: The method of clause 1, wherein: the one or more conditions comprise: the UE having at least two subscriber identity modules (SIMs), the at least two SIMS including a first SIM supporting a first subscription for the first network, the at least two SIMs including a second SIM supporting a second subscription for a second network, the CDRX configuration being for communications with the first network, another CDRX configuration being for communications with the second network, and on-durations of a CDRX cycle of the CDRX configuration conflicting with other on-durations of another CDRX cycle of the other CDRX configuration; and the request comprises at least one of: a request to change a start offset of the CDRX cycle, a request to add a short discontinuous reception (DRX) cycle to the CDRX configuration, a request to change a short DRX cycle length, a request to change a short DRX cycle timer, a request to change a DRX inactivity timer, and a request to change a long DRX cycle length.

Clause 7: The method of clause 1, wherein: the one or more conditions comprise the UE having high mobility; and the request comprises a request to change a previous length of a CDRX cycle of the CDRX configuration to a new length that is shorter than the previous length.

Clause 8: The method of clause 7, further comprising: determining the new length based on a speed of the UE.

Clause 9: The method of any of clauses 7-8, further comprising: determining the new length based on one or more errors detected by the UE.

Clause 10: The method of clause 1, wherein the one or more conditions comprise the UE having a type of data to transmit or receive.

Clause 11: The method of clause 10, wherein: the type of data is mission-critical, and the request comprises a request to change a previous length of a CDRX cycle of the CDRX configuration to a new length that is shorter than the previous length.

Clause 12: The method of clause 10, wherein: the type of data is mission-critical, a CDRX cycle of the CDRX configuration is a long discontinuous reception (DRX) cycle, and the request comprises a request to add a short DRX cycle to the CDRX configuration.

Clause 13: The method of clause 10, wherein: the type of data is non-critical, and the request comprises a request to change a previous length of a CDRX cycle of the CDRX configuration to a new length that is longer than the previous length.

Clause 14: The method of clause 10, wherein: the type of data is non-critical, the CDRX configuration comprises a short discontinuous reception (DRX) cycle, and the request comprises at least one of: a request to change a previous length of the short DRX cycle to a new length that is longer than the previous length, and a request to change a previous short DRX cycle timer length to a new short DRX cycle timer length that is shorter than the previous short DRX cycle timer length.

Clause 15: An apparatus, comprising: a memory comprising executable instructions; and one or more processors configured to execute the executable instructions and cause the apparatus to perform a method in accordance with any one of Clauses 1-14.

Clause 16: An apparatus, comprising means for performing a method in accordance with any one of Clauses 1-14.

Clause 17: A non-transitory computer-readable medium comprising executable instructions that, when executed by one or more processors of an apparatus, cause the apparatus to perform a method in accordance with any one of Clauses 1-14.

Clause 18: A computer program product embodied on a computer-readable storage medium comprising code for performing a method in accordance with any one of Clauses 1-14.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as BS 180 (e.g., gNB) may operate in a traditional sub-6 GHz spectrum, in millimeter wave (mmWave) frequencies, and/or near mmWave frequencies in communication with the UE 104. When the BS 180 operates in mmWave or near mmWave frequencies, the BS 180 may be referred to as an mmWave base station.

The communication links 120 between BSs 102 and, for example, UEs 104, may be through one or more carriers. For example, BSs 102 and UEs 104 may use spectrum up to YMHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communication network 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Transmit processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A, 3B, 3C, and 3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies (µ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and 2µ slots/subframe. The subcarrier spacing and symbol length/duration are a function of the numerology. The subcarrier spacing may be equal to $2^{\mu} \times 15$ kHz, where µ is the numerology 0 to 5. As such, the numerology µ=0 has a subcarrier spacing of 15 kHz and the numerology µ=5 has a subcarrier spacing of 480 kHz. The symbol length/duration is inversely related to the subcarrier spacing. FIGS. 3A, 3B, 3C, and 3D provide an example of slot configuration 0 with 14 symbols per slot and numerology µ=2 with 4 slots per subframe. The slot duration is 0.25 ms, the subcarrier spacing is 60 kHz, and the symbol duration is approximately 16.67 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of transmit assistance information to request changes to discontinuous reception (DRX) parameters to improve performance of a wireless network connection in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the physical (PHY) layer. In the case of a user equipment (as in the example UE 104 of FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communications by a user equipment (UE), the method comprising:
    detecting a plurality of conditions, wherein the plurality of conditions indicates changes to a timing advance (TA) parameter and an overlap between on-durations of multiple connected mode discontinuous reception (CDRX) cycles associated with multiple subscriber identity modules (SIMs) of the UE; and
    transmitting, in response to the detection, a request to change a CDRX configuration to a first network, wherein the request to change the CDRX configuration comprises a request to add one or more discontinuous reception (DRX) cycles to the CDRX configuration.

2. The method of claim 1, wherein the plurality of conditions comprise:
    the UE having at least two SIMs;
    the UE having a mobility;
    the UE having a type of data to send or receive; or
    any combination thereof.

3. The method of claim 1, wherein:
    the plurality of conditions comprise:
        the UE having at least two SIMs,
        the at least two SIMs including a first SIM supporting a first subscription for the first network,
        the at least two SIMs including a second SIM supporting a second subscription for a second network,
        the CDRX configuration being for communications with the first network, and
        on-durations of a CDRX cycle of the CDRX configuration conflicting with paging occasions (POs) of the second network; and
    the request comprises a request to change a length of the CDRX cycle to a new length.

4. The method of claim 3, further comprising:
    determining the new length based on a length of a paging cycle of the second network.

5. The method of claim 3, wherein:
    the CDRX cycle is a long DRX cycle; and
    the request comprises at least one of:
        a request to add a short DRX cycle to the CDRX configuration,
        a request to change a start offset of the CDRX cycle,
        a request to change a short DRX cycle length,
        a request to change a short DRX cycle timer,
        a request to change a DRX inactivity timer, or
        a request to change a long DRX cycle length.

6. The method of claim 1, wherein:
the plurality of conditions comprise:
- the UE having at least two SIMs,
- the at least two SIMs including a first SIM supporting a first subscription for the first network,
- the at least two SIMs including a second SIM supporting a second subscription for a second network,
- the CDRX configuration being for communications with the first network,
- another CDRX configuration being for communications with the second network, and
- on-durations of a CDRX cycle of the CDRX configuration conflicting with other on-durations of another CDRX cycle of the other CDRX configuration; and the request comprises at least one of:
- a request to change a start offset of the CDRX cycle,
- a request to add a short DRX cycle to the CDRX configuration,
- a request to change a short DRX cycle length,
- a request to change a short DRX cycle timer,
- a request to change a DRX inactivity timer, or
- a request to change a long DRX cycle length.

7. The method of claim 1, wherein:
the plurality of conditions comprise the UE having a mobility; and
the request comprises a request to change a previous length of a CDRX cycle of the CDRX configuration to a new length that is shorter than the previous length.

8. The method of claim 7, further comprising:
determining the new length based on a speed of the UE.

9. The method of claim 7, further comprising:
determining the new length based on one or more errors detected by the UE.

10. The method of claim 1, wherein the plurality of conditions comprise the UE having a type of data to transmit or receive.

11. The method of claim 10, wherein:
the type of data is mission-critical, and
the request comprises a request to change a previous length of a CDRX cycle of the CDRX configuration to a new length that is shorter than the previous length.

12. The method of claim 10, wherein:
the type of data is mission-critical,
a CDRX cycle of the CDRX configuration is a long DRX cycle, and
the request comprises a request to add a short DRX cycle to the CDRX configuration.

13. The method of claim 10, wherein:
the type of data is non-critical, and
the request comprises a request to change a previous length of a CDRX cycle of the CDRX configuration to a new length that is longer than the previous length.

14. The method of claim 10, wherein:
the type of data is non-critical,
the CDRX configuration comprises a short discontinuous reception (DRX) cycle, and
the request comprises at least one of:
- a request to change a previous length of the short DRX cycle to a new length that is longer than the previous length, or
- a request to change a previous short DRX cycle timer length to a new short DRX cycle timer length that is shorter than the previous short DRX cycle timer length.

15. A user equipment (UE) configured for wireless communication, comprising:
a memory comprising instructions; and
one or more processors, individually or collectively, configured to execute the instructions and cause the UE to:
- detect a plurality of conditions, wherein the plurality of conditions indicates changes to a timing advance (TA) parameter and an overlap between on-durations of multiple connected mode discontinuous reception (CDRX) cycles associated with multiple subscriber identity modules (SIMs) of the UE; and
- transmit, in response to detecting one or more of the plurality of conditions, a request to change a CDRX configuration to a first network, wherein the request to change the CDRX configuration comprises a request to add one or more discontinuous reception (DRX) cycles to the CDRX configuration.

16. The UE of claim 15, wherein the plurality of conditions comprise:
the UE having at least two SIMs;
the UE having a mobility;
the UE having a type of data to send or receive; or
any combination thereof.

17. The UE of claim 15, wherein:
the plurality of conditions comprise:
- the UE having at least two SIMs,
- the at least two SIMs including a first SIM supporting a first subscription for the first network,
- the at least two SIMs including a second SIM supporting a second subscription for a second network,
- the CDRX configuration being for communications with the first network, and
- on-durations of a CDRX cycle of the CDRX configuration conflicting with paging occasions (POs) of the second network; and the request comprises a request to change a length of the CDRX cycle to a new length.

18. The UE of claim 17, wherein the one or more processors are further configured to execute the instructions and cause the UE to:
determine the new length based on a length of a paging cycle of the second network.

19. The UE of claim 17, wherein:
the CDRX cycle is a long DRX cycle; and
the request comprises at least one of:
- a request to add a short DRX cycle to the CDRX configuration,
- a request to change a start offset of the CDRX cycle,
- a request to change a short DRX cycle length,
- a request to change a short DRX cycle timer,
- a request to change a DRX inactivity timer, or
- a request to change a long DRX cycle length.

20. The UE of claim 15, wherein:
the plurality of conditions comprise:
- the UE having at least two SIMs,
- the at least two SIMs including a first SIM supporting a first subscription for the first network,
- the at least two SIMs including a second SIM supporting a second subscription for a second network,
- the CDRX configuration being for communications with the first network,
- another CDRX configuration being for communications with the second network, and
- on-durations of a CDRX cycle of the CDRX configuration conflicting with other on-durations of another CDRX cycle of the other CDRX configuration; and the request comprises at least one of:
- a request to change a start offset of the CDRX cycle,
- a request to add a short DRX cycle to the CDRX configuration,
- a request to change a short DRX cycle length,
- a request to change a short DRX cycle timer,
- a request to change a DRX inactivity timer, or
- a request to change a long DRX cycle length.

21. The UE of claim 15, wherein:
the plurality of conditions comprise the UE having a mobility; and
the request comprises a request to change a previous length of a CDRX cycle of the CDRX configuration to a new length that is shorter than the previous length.

22. The UE of claim 21, wherein the one or more processors are further configured to execute the instructions and cause the UE to:
determine the new length based on a speed of the UE.

23. The UE of claim 21, wherein the one or more processors are further configured to execute the instructions and cause the UE to:
determine the new length based on one or more errors detected by the UE.

24. The UE of claim 15, wherein the plurality of conditions comprise the UE having a type of data to transmit or receive.

25. The UE of claim 24, wherein:
the type of data is mission-critical, and
the request comprises a request to change a previous length of a CDRX cycle of the CDRX configuration to a new length that is shorter than the previous length.

26. The UE of claim 24, wherein:
the type of data is mission-critical,
a CDRX cycle of the CDRX configuration is a long DRX cycle, and
the request comprises a request to add a short DRX cycle to the CDRX configuration.

27. The UE of claim 24, wherein:
the type of data is non-critical, and
the request comprises a request to change a previous length of a CDRX cycle of the CDRX configuration to a new length that is longer than the previous length.

28. The UE of claim 24, wherein:
the type of data is non-critical,
the CDRX configuration comprises a short DRX cycle, and
the request comprises at least one of:
- a request to change a previous length of the short DRX cycle to a new length that is longer than the previous length, or
- a request to change a previous short DRX cycle timer length to a new short DRX cycle timer length that is shorter than the previous short DRX cycle timer length.

29. A non-transitory computer-readable medium comprising instructions that, when executed by one or more processors of a user equipment (UE), cause the UE to perform a method of wireless communication, comprising:
detecting a plurality of conditions, wherein the plurality of conditions indicates changes to a timing advance (TA) parameter and an overlap between on-durations of multiple connected mode discontinuous reception (CDRX) cycles associated with multiple subscriber identity modules (SIMs) of the UE; and
transmitting, in response to the detection, a request to change a CDRX configuration to a first network, wherein the request to change the CDRX configuration comprises a request to add one or more discontinuous reception (DRX) cycles to the CDRX configuration.

30. A user equipment (UE) configured for wireless communications, the UE comprising:
means for detecting a plurality of conditions, wherein the plurality of conditions indicates changes to a timing advance (TA) parameter and an overlap between on-durations of multiple connected mode discontinuous reception (CDRX) cycles associated with multiple subscriber identity modules (SIMs) of the UE; and
means for transmitting, in response to the detection, a request to change a CDRX configuration to a first network, wherein the request to change the CDRX configuration comprises a request to add one or more discontinuous reception (DRX) cycles to the CDRX configuration.

* * * * *